TRANS-AXLE

Filed June 13, 1961

8 Sheets-Sheet 1

INVENTOR.
THOMAS H. CAPE
BY John R. Faulkner
Donald J. Harrington
ATTORNEYS.

Dec. 24, 1963 T. H. CAPE 3,115,048

TRANS-AXLE

Filed June 13, 1961 8 Sheets-Sheet 2

INVENTOR.
THOMAS H. CAPE
BY John R. Faulkner
Donald J. Harrington
ATTORNEYS.

Dec. 24, 1963 T. H. CAPE 3,115,048

TRANS-AXLE

Filed June 13, 1961 8 Sheets-Sheet 3

INVENTOR.
THOMAS H. CAPE
BY John R. Faulkner
Donald J. Harrington
ATTORNEYS.

TRANS-AXLE

Filed June 13, 1961 8 Sheets-Sheet 4

INVENTOR.
THOMAS H. CAPE
BY John L. Faulkner
Donald J. Harrington
ATTORNEYS.

Dec. 24, 1963 T. H. CAPE 3,115,048

TRANS-AXLE

Filed June 13, 1961 8 Sheets-Sheet 5

INVENTOR.
THOMAS H. CAPE
BY John L. Faulkner
Donald J. Harrington
ATTORNEYS.

Dec. 24, 1963 T. H. CAPE 3,115,048

TRANS-AXLE

Filed June 13, 1961 8 Sheets-Sheet 6

INVENTOR.
THOMAS H. CAPE
BY John R. Faulkner
Donald J. Harrington
ATTORNEYS.

INVENTOR.
THOMAS H. CAPE
BY John R. Faulkner
Donald J. Harrington
ATTORNEYS.

Dec. 24, 1963 T. H. CAPE 3,115,048

TRANS-AXLE

Filed June 13, 1961 8 Sheets-Sheet 7

INVENTOR.
THOMAS H. CAPE
BY John R. Faulkner
Donald J. Harrington
ATTORNEYS.

Dec. 24, 1963 T. H. CAPE 3,115,048

TRANS-AXLE

Filed June 13, 1961 8 Sheets-Sheet 8

INVENTOR.
THOMAS H. CAPE
BY John L. Faulkner
Donald J. Harrington
ATTORNEYS.

United States Patent Office 3,115,048
Patented Dec. 24, 1963

3,115,048
TRANS-AXLE

Thomas H. Cape, Plymouth, Mich., assignor to Ford Motor Company, Dearborn, Mich., a corporation of Delaware Filed June 13, 1961, Ser. No. 116,762
6 Claims. (Cl. 74—375)

My invention relates generally to power transmitting mechanisms, and more particularly to a gear arrangement of the trans-axle type.

The mechanism of my invention is adapted particularly to be used with automotive vehicles, and it can be assembled to the cylinder block of a vehicle engine to form a unitary power package.

According to one preferred embodiment of my invention, the engine and power transmitting mechanism are arranged in the forward vehicle compartment and adapted to power transversely extending drive shafts for the front wheels. The mechanism includes a differential assembly capable of transferring power from a power output pinion to a drive shaft for each of the forward traction wheels. The pinion is carried by a shaft that is straddle mounted at spaced locations within the transmission casing. An engine driven power input shaft extends concentrically through the shaft for the power output pinion and terminates within the housing portion that accommodates a torque transmitting gear assembly.

The gear assembly includes a cluster gear disposed about a countershaft and a plurality of gears concentrically disposed with respect to the power input shaft. Synchronizer clutch means are provided for controlling the relative motion of the gears whereby a plurality of torque delivery paths are provided between the power input shaft and the power output pinion, each path being characterized by a separate torque transmitting ratio. In the instant embodiment, four forward drive speed ratios and a single reverse speed ratio are provided.

According to one feature of my invention, the engine driven power input shaft can be removed from the transmission mechanism without disassembling the transmission mechanism from the engine itself. This can be accomplished by adapting the power input shaft to be withdrawn axially in a rearward direction. It thus is possible to remove the clutch from the power train without the necessity of removing the engine or the transmission mechanism.

According to another feature of my invention, a movable portion of one of the synchronizer assemblies functions also as a reverse driving gear that is adapted to engage a reverse driving pinion to define a reverse torque delivery path between the power input shaft and the power output pinion.

According to another feature of my invention, I have provided a new and improved interlock mechanism for inhibiting the motion of one of the gear controlling elements of the gear assembly while another gear controlling element is being actuated. The interlock system thus establishes a proper sequential movement of the various shift controlling elements.

The provision of a transmission having the characteristics discussed in the foregoing paragraphs being among the objects of my invention, it is a further object of my invention to provide a power transmitting mechanism having gear elements that define a plurality of torque delivery paths between the power input shaft and the power output shaft and a synchronizer clutch means for clutching selectively one of the shafts to a gear element of each gear train, said synchronizer clutch means being characterized by an axially movable clutch sleeve that defines a portion of a third torque delivery path.

It is a further object of my invention to provide a power transmission mechanism of the trans-axle type having a power input shaft concentrically disposed within a power output pinion and having a gear assembly for establishing selectively a plurality of torque transmitting ratios between said power input shaft and said pinion, said power output pinion and gear assembly being arranged within spaced portions of an integral, common housing.

It is another object of my invention to provide a means for controlling the relative motion of the gear elements of the transmission mechanism.

Other objects and features of my invention will become apparent from the following description and from the accompanying drawings wherein:

FIGURE 8 is taken along section line 8—8 of FIGURE 1;

Figure 1:
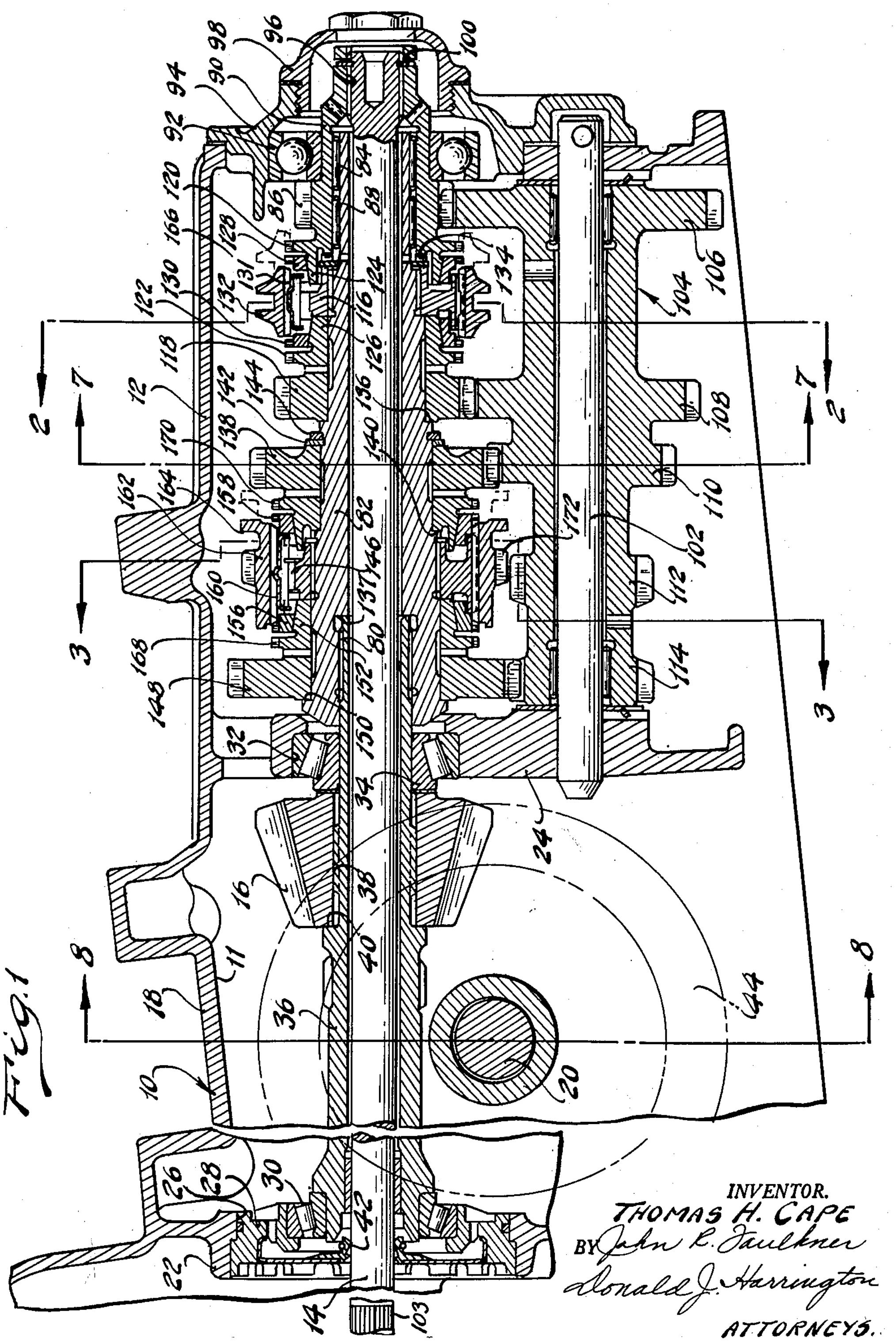
FIGURE 1 shows a longitudinal cross sectional view of the trans-axle assembly.
Figure 8:
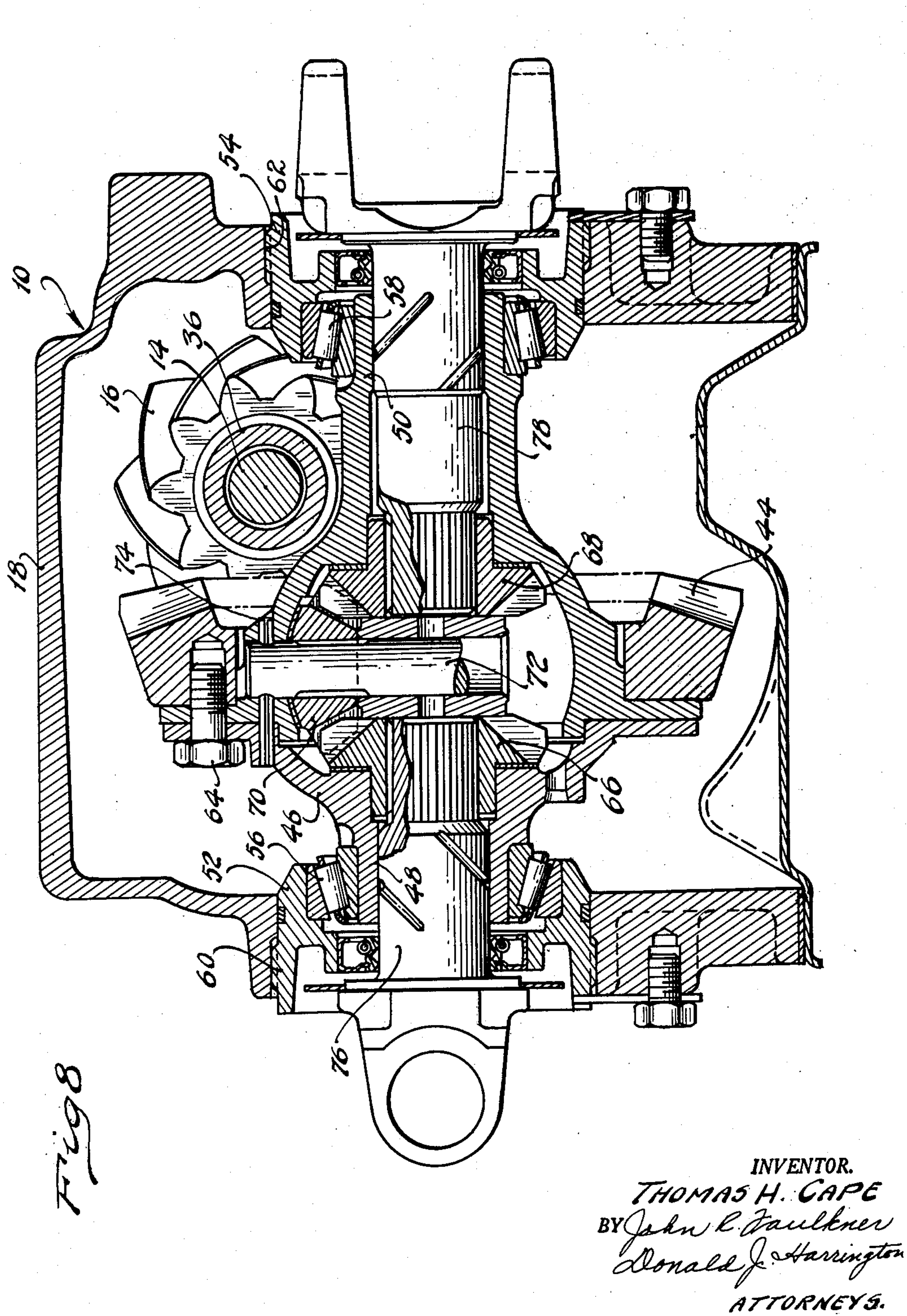
FIGURE 8 is a cross sectional assembly view of the differential mechanism that is situated between the engine and the gear elements.
Figures 10, 11:
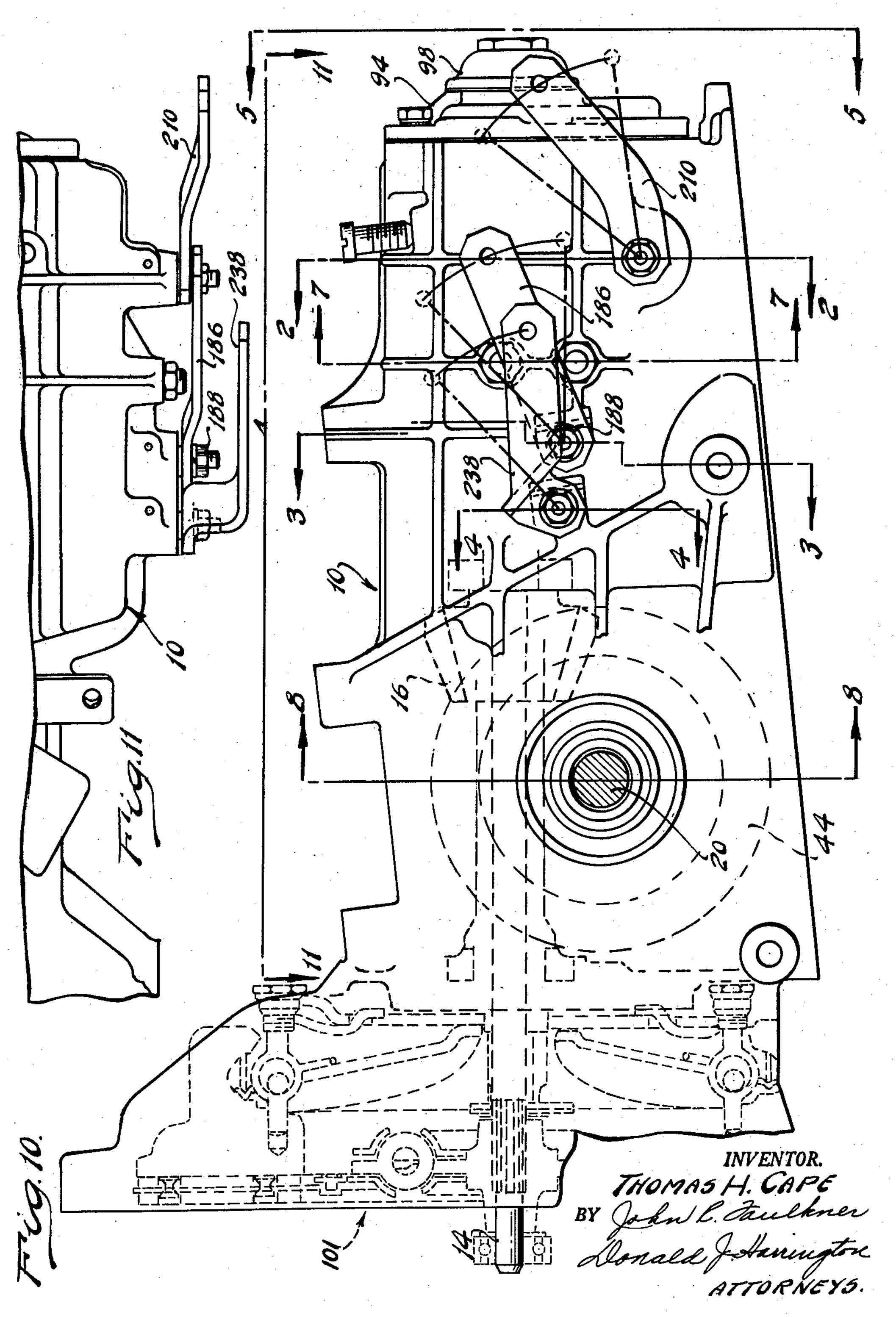
FIGURE 10 is a side elevation view of the transmission assembly.
FIGURE 11 is a partial plan view of the transmission mechanism as viewed from the plane of section line 11—11 of FIGURE 10.

Referring first to FIGURE 1, the trans-axle casing is designated generally by referencce character 10. It includes a forward portion 11 that can be bolted to the engine block for a vehicle engine in a conventional fashion. It includes also a portion 12 adapted to enclose a plurality of gear elements that define a plurality of torque transmitting paths between a power input shaft 14 and a power output differential pinion 16. The casing 10 further includes an intermediate section 18 that encloses a differential mechanism of which the pinion 16 forms a part. The differential mechanism will be discussed in detail with reference to FIGURE 8 and it is adapted to transfer driving torque from the pinion 16 to transversely disposed drive shaft yokes, one of which is shown at 20. These yokes may be connected to the traction wheels through vehicle drive shafts.

The casing 10 is provided with a forward wall or partition 22 and an intermediate partition 24. The partition 22 is formed with an opening 26 within which a bearing retainer 28 is received threadably. A bearing 30 is situated within the retainer 28.

The partition 24 is formed with bearing opening 32 within which is situated a bearing 34. A sleeve shaft 36 is straddle mounted by the bearings 30 and 34. The pinion 16 is splined at 38 to the sleeve shaft 36 and engages a boss 40, the later inhibiting relative axial movement of the pinion 16 with respect to the shaft 36. The hub of piniion 16 engages also the inner race for the bearing 34. Each of the bearings 30 and 34 includes tapered roller elements that are capable of accommodating an axial thrust as well as radial loads.

The aforementioned casing portion 11 is adapted to accommodate a releasable friction clutch capable of establishing a driving connection between an engine crankshaft and the power input shaft 14, the latter extending concentrically through the sleeve shaft 36 as indicated. A suitable fluid seal 42 is situated between the shaft 14 and the bearing retainer 28.

The differential pinion 16 engages a differential ring gear shown at 44. The mechanism of which ring gear 44 forms a part can best be seen in FIGURE 8.

A differential carrier is shown at 46 and it includes extended portions 48 and 50 that are journaled respectively in bearing retainers 52 and 54. A tapered roller bearing 56 is provided for the extension 48 and a tapered roller bearing 58 is provided for the extension 50. The retainer 52 is received threadably within an opening 60 and the aforementioned casing portion 18, and the bearing retainer 54 is received threadably within an opening 62, the opening 62 being aligned with opening 60 in a transverse direction with respect to the plane of the section for FIGURE 1. The ring gear 44 is bolted by means of bolts 64 to the periphery of the differential carrier 46.

A pair of differential side gears is arranged within the carrier 46 as shown at 66 and 68. The side gears engage pinions 70 journaled on shaft 72, the latter in turn being secured to the differential carrier 46 and held against relative movement with respect to the carrier 46 by a pin 74 that is received within a cooperating annular groove in the shaft 72.

The differential side gears 66 and 68 are splined to shafts 76 and 78, respectively, each shaft forming a portion of a universal joint yoke. These universal joints form a connection with transversely disposed drive shafts extending to each of the vehicle traction wheels.

Shaft 36 is received within an opening 80 in a main shaft 82, the latter extending through the casing portion 12. Shaft 36 is splined to main shaft 82 to form a positive driving connection therebetween.

The right-hand end of main shaft 82, as viewed in FIGURE 1, is received within an opening 84 formed in the hub of a power input gear 86. Needle bearings 88 are provided for the purpose of journaling shaft 82 within the bearing hub. Gear 86 is formed within an extension 90 that is received within a bearing 92, the latter being supported within a bearing retainer 94. Retainer 94 serves also as a closure plate for the transmission casing portion 12.

Shaft 14 is splined as shown at 96 to the extension 90 of the gear 86. The splined connection is surrounded by a cap 98 threeadably received within the closure 94. The cap 98 can be removed when desired in order to expose this connection.

A U-shaped retainer 100 is received within a groove formed in the splined end of shaft 14. The retainer 100 is received within cooperating slots formed in the extenssion 90 for the purpose of retaining the shaft 14 in a relatively fixed position with respect to the extension 90.

When the cap 98 is removed for servicing purposes, the retainer 100 can be removed readily by withdrawing the same in a direction transverse to the axis of the shaft 14. Shaft 14 then can be pulled through the shaft 82 and the shaft 36. When this is done, a neutral clutch 101 at the forward end of the transmission mechanism can be removed from the casing 10. A releasable splined connection, shown in part at 103, between the shaft 14 and the driven element of the clutch structure is provided for this purpose.

A countershaft is shown at 102 and is supported by the transmission casing. A cluster gear assembly is rotatably journaled on shaft 102 and is identified generally by reference character 104. The cluster gear assembly 104 includes gear elements 106, 108, 110, 112 and 114. The gear 86 drivably engages gear element 106.

A synchronizer hub 116 is splined to shaft 82 adjacent gear 86. A gear 118 is journaled rotatably on shaft 82 adjacent hub 116 and engages the gear element 108 on the cluster gear assembly 104.

Gear 86 is formed with clutch teeth 120 and the gear 118 is formed with clutch teeth 122. Cone clutch elements 124 and 126 are formed integrally with the gears 118 and 120 adjacent the associated synchronizer clutch teeth. A blocker element 128 is disposed about the cone clutch 124 and a corresponding blocker element 130 is disposed about the clutch element 126.

A synchronizer clutch sleeve 132 is splined slidably upon hub 116 and is adapted to be moved into engagement with either the clutch teeth 120 or clutch teeth 122. A synchronizer thrust bar 131 is actuated by the sleeve 132 and is adapted to apply a clutching force to either of the blocker elements 128 or 130 depending upon the direction of movement of the sleeve 132.

A clutching action between the blocking elements and the associated cone clutch surfaces establishes synchronism between shaft 82 and the respective gears 86 or 118 at a time prior to engagement of the synchronizer clutch teeth by the internal spline teeth of the sleeve 132. When the sleeve 132 is moved in a right-hand direction as viewed in FIGURE 1, the shaft 82 becomes locked to gear 86. When it is moved in a left-hand direction, shaft 82 becomes locked to gear 118.

A radial needle thrust bearing 134 is disposed between gear 86 and the hub 116. The gear 118 in turn is axially positioned between a shoulder 136 of the shaft 82 and the hub 116. Thrust forces acting on shaft 82 are accommodated by bearing 134 or by a shoulder 137 that engages the end of shaft 36.

A gear 138 is rotatably mounted on shaft 82 adjacent a shoulder 140. It is held in a relatively axially fixed position by means of a thrust washer 142 and a cooperating snap ring 144. A synchronizer hub 146 is splined to the shaft 82 adjacent gear 138.

Another gear 148 is rotatably mounted on shaft 82 between a shoulder 150 and the hub 146. Gear 148 is formed with a cone clutch element 152 and gear 138 is formed with a corresponding cone clutch element 154. A blocker element 156 is disposed about the clutch element 152 and a corresponding blocker element 158 is disposed about the clutch element 154. These blocker elements function in a known fashion to establish synchronism between shaft 82 and the respective gears 148 and 138 when an axial force is applied thereto by means of the thrust bars 160.

A synchronizer clutch sleeve 162 is internally splined and adapted for axial movement upon splined hub 146. It is formed with an annular groove 164 that is adapted to receive the shoes of a shifting fork later to be described. The sleeve 132 is formed with a corresponding annular groove 166 that is adapted to receive the shoes of another shifter fork.

When the sleeve 162 is moved in a left-hand direction as viewed in FIGURE 1, it engages clutch teeth 168 formed on gear 148 to establish a driving connection between shaft 82 and gear 148. Similarly, when the sleeve 162 is moved in a right-hand direction as shown in FIGURE 1, clutching engagement is established with clutch teeth 170 that are formed on gear 138. This establishes a driving connection between shaft 82 and gear 138.

The synchronizer clutch assemblies of which the sleeves 162 and 132 form a part act in a known fashion to establish a synchronizing action between the associated relatively rotatable components of the mechanism. For a more complete description of the manner in which such a synchronizer functions, reference may be made to the copending application of Everett P. Kennedy, Serial No. 766,851, filed October 13, 1958 and now Patent No. 3,080,028. This application is assigned to the assignee of my instant invention.

A plurality of torque delivery paths can be established selectively by controlling appropriately the movement of the synchronizer clutch sleeves 162 and 166 in sequence with the operation of the main neutral clutch, not shown.

To establish the lowest speed ratio, clutch sleeve 162 is moved in a left-hand direction. The power flow path thus is defined by the power input shaft 14, gear 86, gear element 106, gear element 114, gear 148, shaft 82, shaft 36 and power output pinion 16. Second speed ratio operation can be obtained by shifting sleeve 162 in a right-hand direction thereby locking shaft 82 to the gear 138. Sleeve 132 assumes the neutral position shown in FIGURE 1 during operaton in both the first and second speed ratios. The power flow path during second speed ratio operation thus is defined by shaft 14, gear 86, gear element 106, gear element 110, gear 138, shaft 82, shaft 36 and power output pinion 16.

To establish third speed ratio operation, sleeve 162 is moved to the neutral position and sleeve 132 is moved in a left-hand direction as viewed in FIGURE 1 thereby locking gear 118 to the shaft 82. The power flow path thus is defined by shaft 14, gear 86, gear element 106, gear element 108, gear 118, shaft 82, shaft 36 and power output pinion 16.

Fourth speed ratio operation is established by moving sleeve 132 in a right-hand direction. This locks the shaft 14 to the shaft 82 and a direct drive thus is established between the shaft 14 and the power output pinion 16.

During operation in any of the forward driving speed ratios, the relative motion of the gears 148, 138 or 118 relative to shaft 82 is not unduly high regardless of the speed ratio in which the mechanism is operating. This is due to the fact that the idling motion of any one of the gears is in the same direction as the direction of rotation of the shaft 82 during operation. Design problems associated with overspeeding of the idling gears thus are eliminated.

The sleeve 162 has formed thereon gear teeth that define a reverse drive gear identified by reference numeral 172. When the sleeve 162 assumes the position shown in FIGURE 1, the teeth of gear 172 engage reverse idler pinion 174 shown in FIGURE 9. This pinion is journaled by means of a bushing 176 on the reverse side of the pinion shaft 178. The shaft 178 is end supported by the partition 24 for the casing 10 and by a boss 180. The boss 180 and the partition 24 are formed with appropriate openings for receiving the shaft 178.

Pinion 174 is formed with an annular groove 182. This groove 182 accommodates the fingers of a reverse idler shifter fork that is adapted to shift the idler along the shaft 178.

Figure 9:
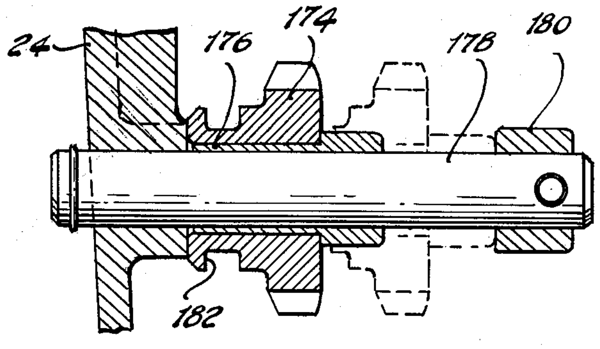
FIGURE 9 is a partial cross sectional view taken along section line 9—9 of FIGURE 3 showing the reverse idler pinion.

When the idler 174 assumes the position shown in FIGURE 9, the teeth of the pinion 174 are situated between gear elements 114 and 112 on the cluster gear assembly 104. When the idler 174 is shifted in a right-hand direction as viewed in FIGURE 9, the idler teeth drivably engage the teeth of gear element 112. If the sleeve 162 is in the neutral position shown in FIGURE 1, the teeth of idler 174 will engage also the gear 172. A reverse drive power flow path thus is established. This path is defined by shaft 14, gear 86, gear element 106, gear element 112, reverse idler pinion 174, reverse gear 172, synchronizer hub 146, shaft 82, shaft 36 and power output pinion 16. The reverse idler pinion functions to reverse the direction of rotation of the shaft 82 and power output pinion 16 relative to the direction of rotation of shaft 14.

Figure 2:
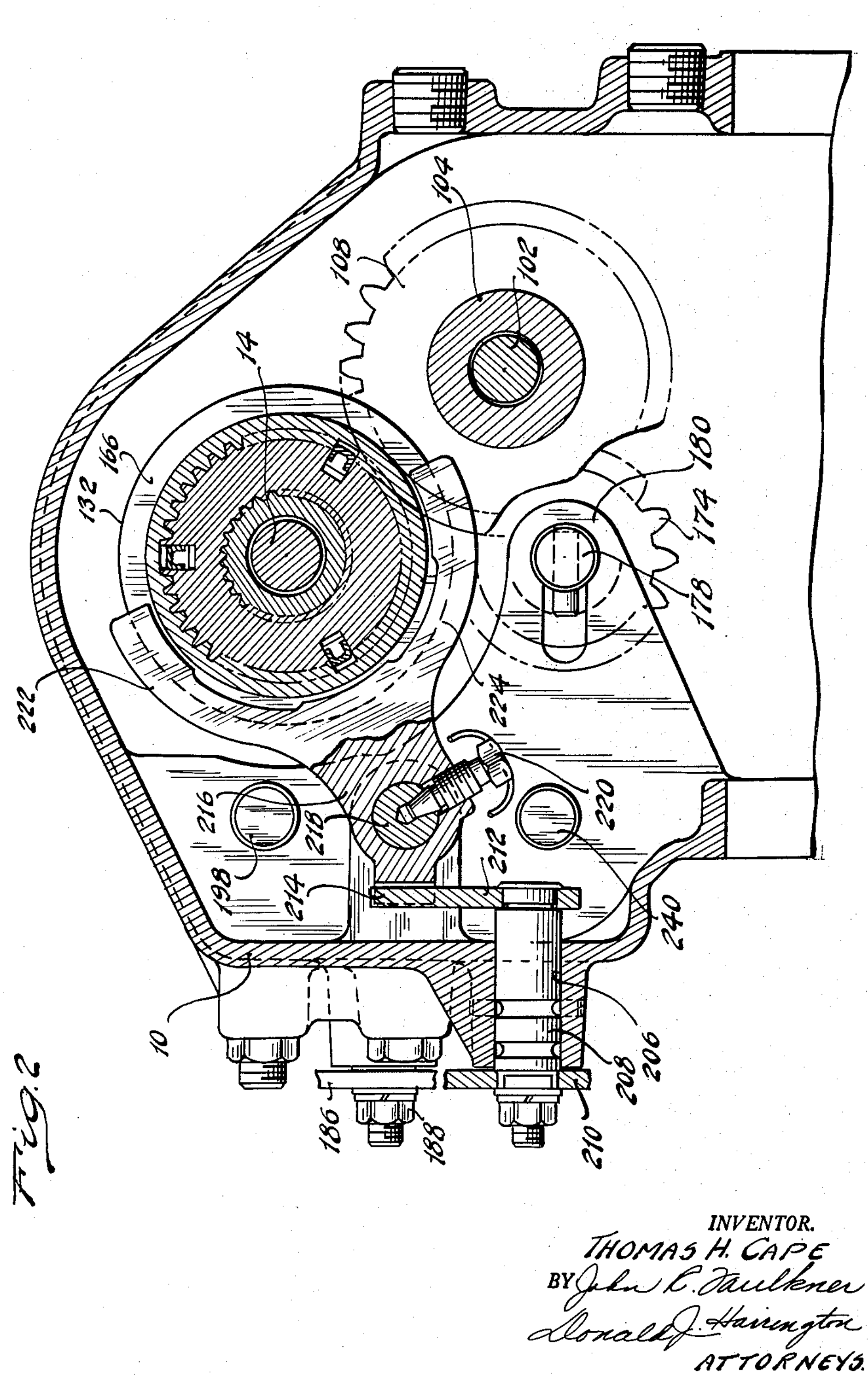
FIGURE 2 is a transverse cross sectional view taken along section line 2—2 of FIGURE 1.
Figure 3:
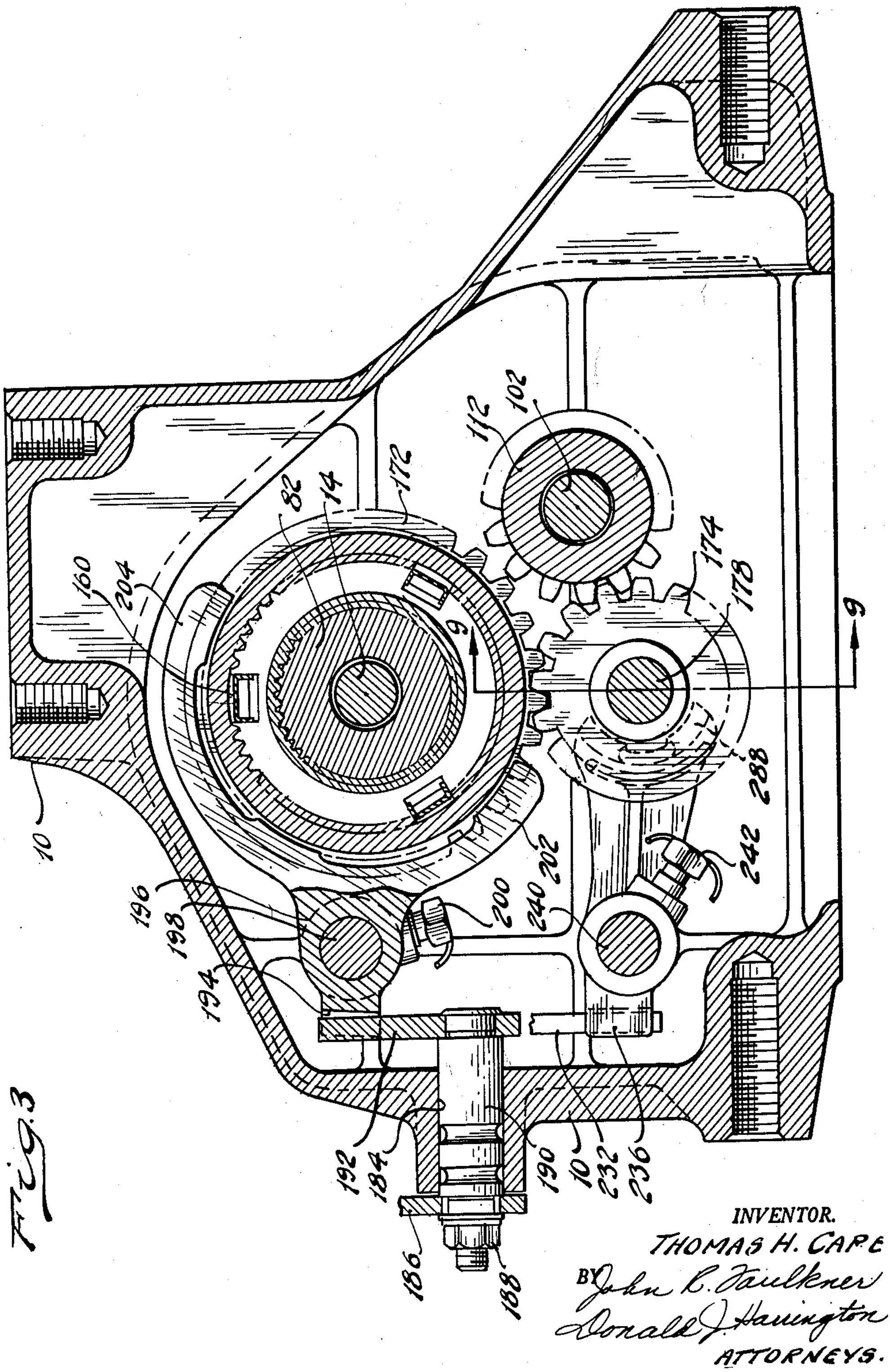
FIGURE 3 is a transverse cross sectional view taken along section line 3—3 of FIGURE 1.

Referring next to FIGURES 2 through 5, the mechanism for shifting the reverse idler pinion and the two synchronizer clutch sleeves is shown in more particular detail. As seen in FIGURE 3, the casing 10 is formed with a side opening 184. A lever 186 is fixed by means of a locking nut 188 to the extended end of a shaft 190 that is journaled in the opening 184. Another lever 192 is fixed at the other end of shaft 190. This lever 192 is adapted to oscillate about the axis of shaft 190 when the lever 186 is rotated. A suitable mechanical shift linkage between the operator controlled shift lever and the lever 186 can be provided.

The lever 192 is received within a recess 194 in a shifting fork 196 for the synchronizer sleeve 162. The fork 196 is connected to a shift rail 198 and held in a relatively fixed position thereon by a set screw 200.

The fork 196 includes fingers 202 and 204 that are received within the previously mentioned annular groove 164 in the sleeve 162.

Referring next to FIGURE 2, a second side opening 206 is formed in the casing 10 and a shaft 208 is journaled therein. The outer end of shaft 208 has secured thereto a shift lever 210 which in turn can be connected to a manually operated shift lever by a suitable gear shift linkage mechanism. The inward end of shaft 208 has secured thereto a lever 212 and it is situated within a slot 214 formed in a shifting fork 216. The fork 216 is carried by a shift rail 218 and is fixed securely thereto by a set screw 220.

The fork 216 has formed thereon a pair of shift fingers 222 and 224 that are received within an annular groove 166 in the synchronizer sleeve 132.

When the lever 210 is rotated about the axis of the shaft 208, the shifter fork 216 oscillates in the direction of the axis of the shift rail 218 thereby causing the synchronizer sleeve 132 to move in either a left-hand direction or a right-hand direction as viewed in FIGURE 1.

Figure 4:
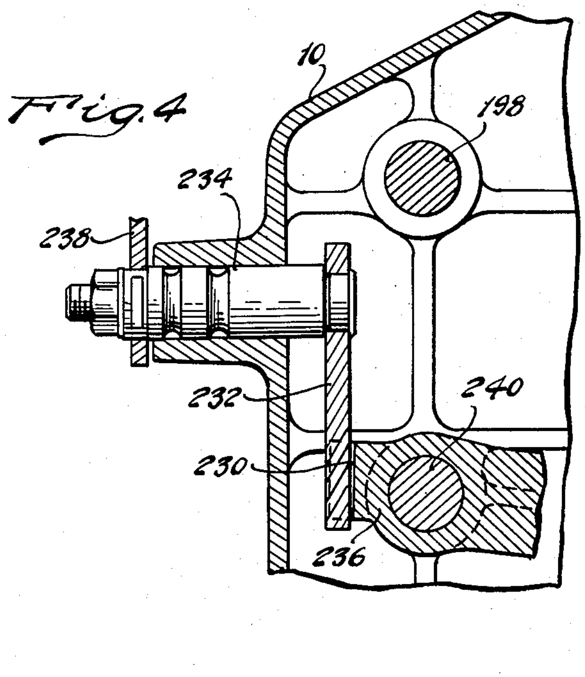
FIGURE 4 is a partial transverse cross sectional view taken along section line 4—4 of FIGURE 10.
Figure 5:
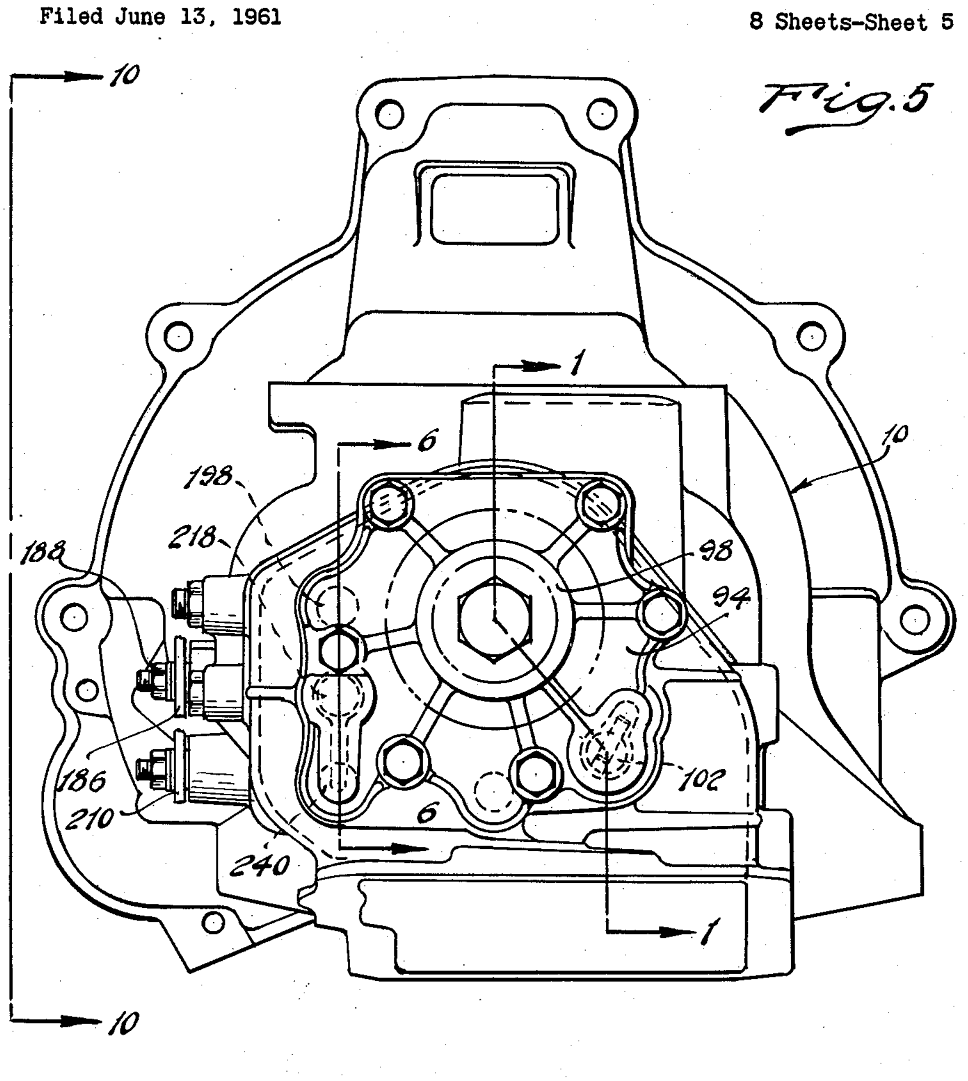
FIGURE 5 is a rear end view of the trans-axle assembly.

Referring next to FIGURE 4, a shifting fork 226 is provided for the reverse idler pinion. It includes fingers that engage the annular groove 182 in the reverse idler pinion, said fingers being shown at 228 in FIGURE 3.

A recess 230 is formed in the fork 226 and it receives a lever 232 carried by the inner end of the shaft 234, said shaft being journaled in a side opening 236 in the casing 10. A shift lever 238 is carried by the outer end of the shaft 234 and is connected operatively to the shift lever to permit the vehicle operator to oscillate the shaft 234 by means of the gear shift lever mechanism thus appropriately positioning the reverse idler pinion for reverse drive operation. The fork 226 is fixed to a reverse idler shift rail 240 by means of a set screw 242.

Figure 6:
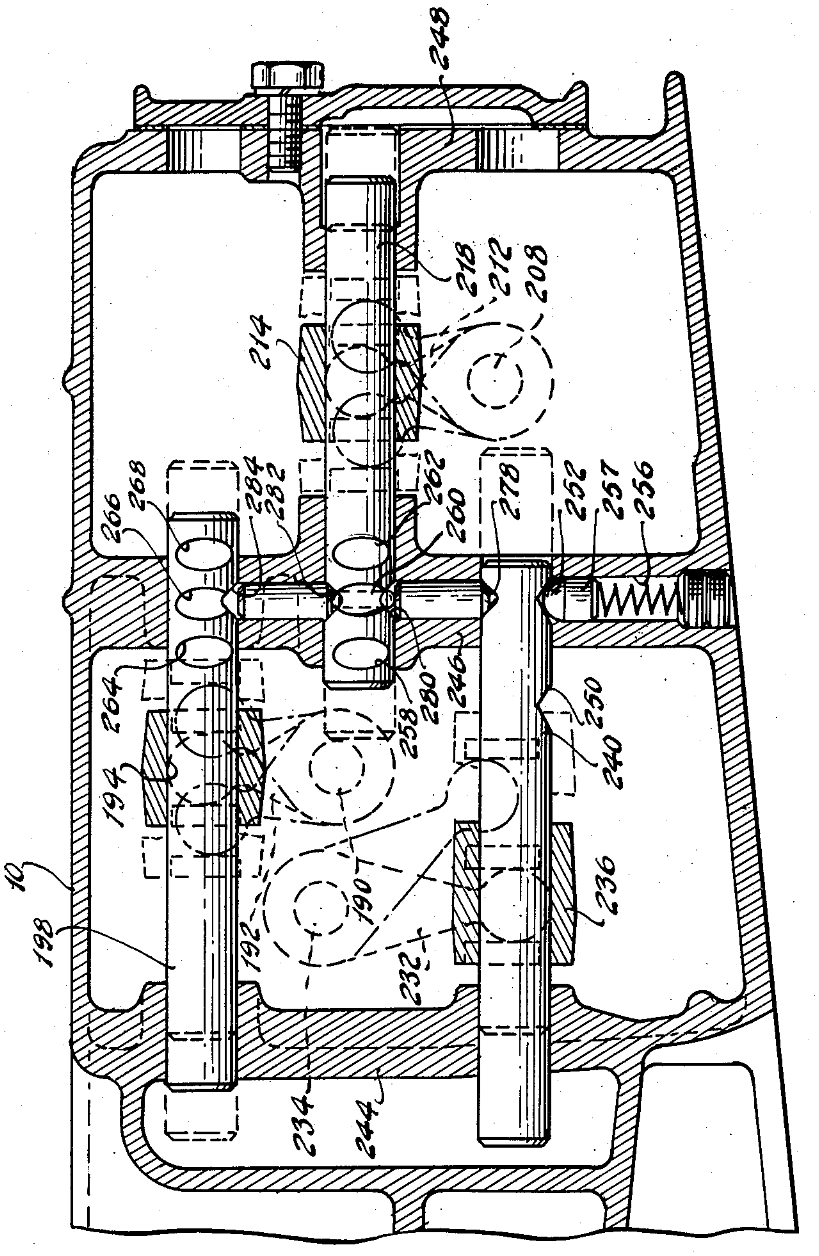
FIGURE 6 is a sectional view taken along section line 6—6 of FIGURE 5 showing the shift rail arrangement.
Figure 6:
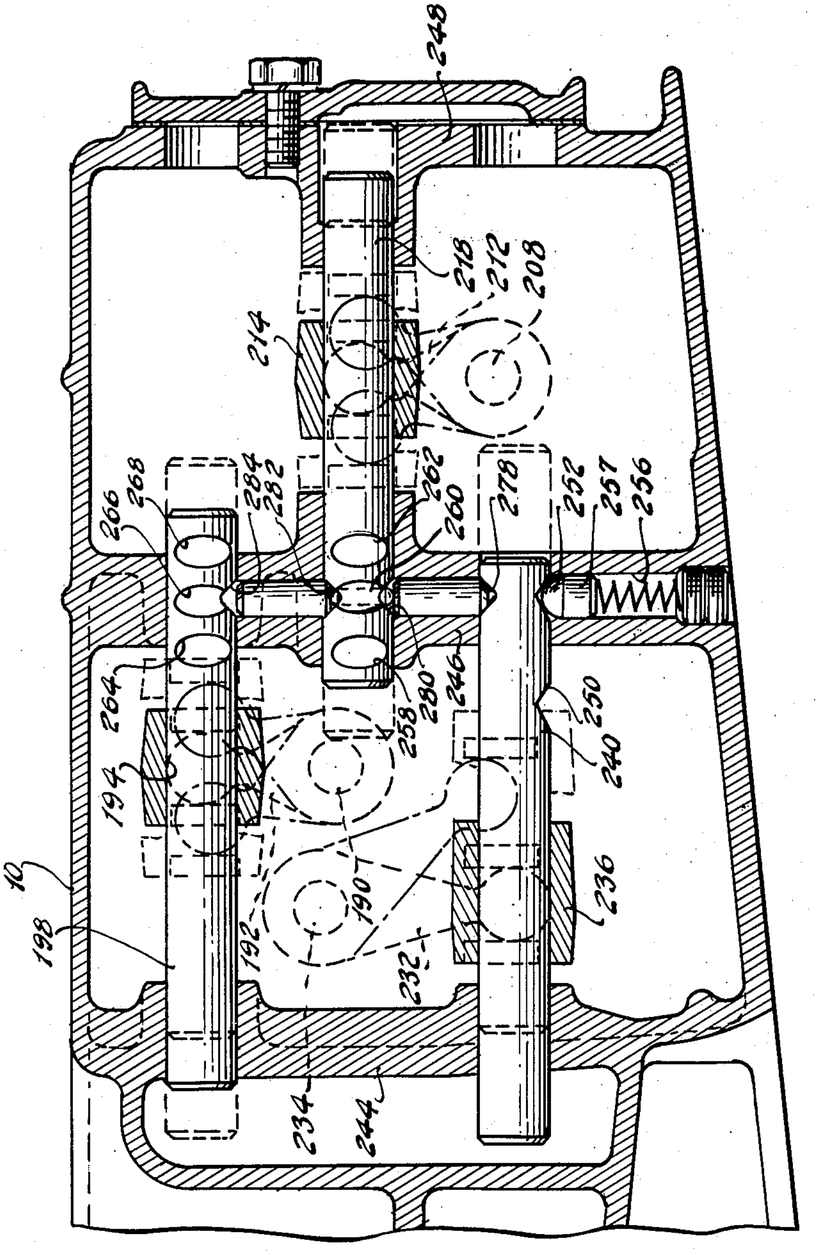

Referring next to FIGURE 6, the various shift rails are shown in more particular detail. The rails 240 and 198 are supported by bosses 244 and 246, said bosses forming a part of the transmission casing 10. The rails 240 and 198 are received slidably within aligned openings in the bosses 244 and 246.

The shift rail 218 for the third speed synchronizer is supported slidably by boss 246 in an end wall 248 of the casing 10. This wall 248 and the boss 246 are formed with aligned openings in which the rail 218 is slidably positioned.

The reverse idler shift rail is formed with two detent recesses 250 and 252. These recesses respectively define the two positions that the shift rail assumes. A detent plunger 254 is positioned slidably within a cooperating opening formed in the boss 246 and is spring urged by a spring 256 into engagement with one or the other of recesses 250 or 252. When it engages recess 252, the reverse idler assumes a disengaged position and when it cooperates with the recess 250, the reverse idler is conditioned for reverse drive operation.

Each of the other shift rails is formed with three detent recesses. Shift rail 218 is formed with detent recesses 258, 260 and 262 and the shift rail 198 is formed with detent recesses 264, 266 and 268.

Figure 7:
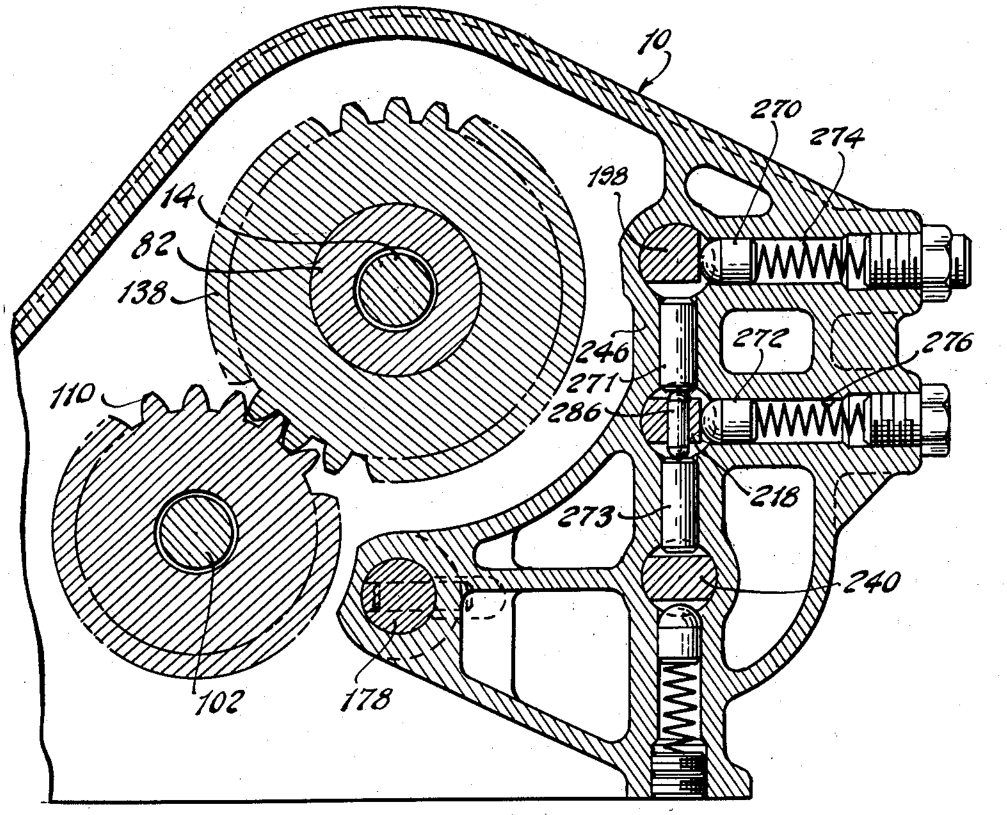
FIGURE 7 is a sectional view taken through a portion of the transmission housing showing the interlock mechanism for the shift rails of FIGURE 6.

Referring to FIGURE 7, the detent elements that cooperate with the recesses for rails 198 and 218 are shown at 270 and 272, respectively. These elements are positioned slidably within cooperating openings in the boss 246. Cooperating detent springs for these elements are shown at 274 and 276, respectively.

The recesses 264, 266 and 268 position the synchronizer sleeve 162 for first speed operation, neutral and second speed operation, respectively. In a similar fashion, the detent recesses 258, 260 and 262 respectively define the three positions for the sleeve 132; namely, the third speed ratio position, neutral or the direct drive position.

In order to inhibit shifting movement of any of the rails while another rail is in a position other than the neutral position, we have provided a new and improved interlock mechanism as best seen in FIGURES 6 and 7. This mechanism includes a pair of interlock plungers 271 and 273 formed in the boss 246. Plunger 273 is adapted to engage cooperating recesses 278 or 280 in the shift rails 240 or 218, respectively. When the shift rail 218 is moved either to the right or the left as viewed in FIGURE 6, the plunger 273 will be shifted so that it will register with the recess 278 in the shift rail 240. This will inhibit movement of the shift rail 240 thereby preventing the vehicle operator from shifting the reverse idler pinion to the reverse position while the transmission is operating in either the high speed range or the third speed ratio range. In a similar fashion, plunger 271 is adapted to engage a recess 282 in the shift rail 218 and a recess 284 in the shift rail 198. When the shift rail 218 is moved either to the right or the left as viewed in FIGURE 6, the plunger 271 will move into registry with recess 284 thereby inhibiting movement of the shift rail 198. Rail 198 thus is maintained in a neutral position whenever the synchronizer clutch sleeve 132 is moved to the third speed ratio position or the direct drive position.

It thus is seen that an interlock is provided between rails 240 and 218 and also between rails 218 and 198. It is necessary, however, to provide a corresponding interlock between rails 198 and 240 so that rail 240 cannot be shifted when the rail 198 is in either the first speed ratio position or the second speed ratio position. Conversely, means must be provided for inhibiting movement of the rail 198 to either the first speed ratio position or the second speed ratio position when the reverse idler pinion is in a reverse driving position. The interlock between the rails 198 and 240 is provided by means of an auxiliary plunger 286 that is slidably positioned in the rail 218 intermediate the plungers 271 and 273. It functions to transfer the motion of one of the plungers 271 or 273 to the other. For example, when the reverse idler shift rail 240 is moved to a reverse driving position, plunger 273 is moved in an upward direction so that it registers with the recess 280. This movement is transferred to plunger 271 by the auxiliary plunger 286. Plunger 271 thus moves into registry with recess 284 to inhibit movement of the shift rail 198 from its neutral position.

Conversely, when the reverse idler pinion is in an inoperative position, and the shift rail 198 is in either a first speed ratio position or a second speed ratio position, the plunger 271 is moved into registry with the cooperating recess 282 in the shift rail 218. This movement of the plunger 271 is transferred to plunger 273 through the auxiliary plunger 286 thus causing the plunger 273 to register with recess 278 in the shift rail 240. Movement of the shift rail 240 into a reverse driving position thus is inhibited under these conditions.

Having thus described a preferred embodiment of my invention, what I claim and desire to secure by United States Letters Patent is:

1. A power transmission mechanism comprising spaced transmission casing portions, a differential drive pinion rotatably journaled in one casing portion, a multiple speed gear mechanism disposed in another portion of said casing, a power input shaft extending through each casing portion in concentric relationship with respect to said drive pinion, said gear mechanism comprising an intermediate sleeve shaft journaled in said other casing portion, a releasable driving connection between said differential drive pinion and said intermediate sleeve shaft, a cluster gear assembly rotatably journaled in said other casing portion in spaced parallel relationship with respect to said power input shaft, a plurality of torque transmitting gears rotatably mounted on said sleeve shaft in driving relationship with respect to gear elements of said cluster gear assembly, and synchronizer clutch means for selectively clutching said gears to said intermediate sleeve shaft, said synchronizer clutch means including a sleeve that is axially shiftable to either of two clutching positions or to a position intermediate said clutching positions, said sleeve defining a portion of a torque transmitting geared path between said power input shaft and said sleeve shaft, said geared path being defined in part by said cluster gear assembly, the release of said driving connection between said sleeve shaft and differential pinion enabling the removal of said sleeve shaft and gear mechanism from said casing.

2. A power transmisison mechanism comprising spaced transmission casing portions, a power output pinion, a sleeve shaft connected to said pinion, means for journaling said sleeve shaft at spaced locations within one of said casing portions, a power transmitting gear train situated in the other casing portion, a torque input shaft, a power input shaft extending concentrically through said sleeve shaft and through said other portion, clutch means releasably connected to and connecting said torque input and power input shafts, means for releasably connecting said power input shaft to a power input element of said gear train, means for selectively providing geared power delivery paths between said power input element and said power output pinion, each geared path being characterized by a separate power transmitting ratio, the connections between said torque input shaft and said power input shaft and said power input shaft and said power input element being disposed adjacent opposite extremities of said casing, and means for releasing said connections whereby said power input shaft may be removed by withdrawing the power input shaft axially through said sleeve shaft and through said power delivery gear elements in the direction of the common axis of said sleeve shaft and said power input shaft, the release of the connections between said torque input and power input shafts enabling the removal of said clutch means from said casing.

3. A power transmission mechanism comprising spaced transmission casing portions, a differential drive pinion rotatably journaled in one casing portion, a multiple speed gear mechanism disposed in another portion of said casing, a power input shaft extending through each casing portion in concentric relationship with respect to said drive pinion, said gear mechanism comprising an intermediate sleeve shaft journaled in said other casing portion, a releasable driving connection between said differential drive pinion and said intermediate sleeve shaft, a cluster gear assembly rotatably journaled in said other casing portion in spaced parallel relationship with respect to said power input shaft, a plurality of torque transmitting gears rotatably mounted on said sleeve shaft in driving relationship with respect to gear elements of said cluster gear assembly, synchronizer clutch means for selectively clutching said gears to said intermediate sleeve shaft, said synchronizer clutch means including a sleeve that is axially shiftable to either of two clutching positions to establish two forward drives or to a position intermediate said clutching positions, an idler gear journaled for rotation about an axis that is in spaced parallel relationship with respect to the axis of said cluster gear assembly, said idler gear being engageable with one gear element of said cluster gear assembly, and a reverse gear element carried by said sleeve, said gear element of said sleeve being engageable with said idler gear upon movement of said sleeve to said intermediate position whereby said sleeve defines a portion of a reverse torque transmitting gear path between said power input shaft and said sleeve shaft, said gear path being defined in part by said cluster gear assembly and said idler gear, the release of said driving connection between said sleeve shaft and differential pinion enabling the removal of said sleeve shaft and gear mechanism from said casing.

4. A power transmission mechanism comprising a casing, a power input shaft, a power output shaft, a multiple speed gear mechanism disposed in said casing, said gear mechanism comprising an intermediate sleeve shaft journaled in said casing, a releasable driving connection between said power output shaft and said sleeve shaft, a cluster gear assembly rotatably journaled in said casing in spaced parallel relationship with respect to said power input shaft, a plurality of torque transmitting gears rotatably mounted on said sleeve shaft in driving relationship with respect to gear elements of said cluster gear assembly, synchronizer clutch means for selectively clutching said gears to said intermediate shaft, said synchronizer clutch means including a sleeve, a synchronizer hub carried by said intermediate shaft for supporting said sleeve, said sleeve being shiftable axially in opposite directions on said hub into clutching engagement with either of two forward drive gears journaled upon said intermediate shaft, a reverse gear element carried by said sleeve, the gear element of said sleeve being situated in driving relationship with respect to an element of said cluster gear assembly when said sleeve is moved out of clutching engagement with either of said two gears whereby the gear element of said sleeve and said cluster gear assembly define in part a reverse torque transmitting path between said power input shaft and said power output shaft, the release of said driving connection between said sleeve and output shafts enabling the removal of said sleeve shaft and gear mechanism from said casing.

5. A power transmission mechanism comprising a casing, a power input shaft, a power output shaft, a multiple speed gear mechanism disposed in said casing, said gear mechanism comprising an intermediate sleeve shaft journaled in said casing, a releasable driving connection between said power output shaft and said sleeve shaft, a cluster gear assembly rotatably journaled in said casing in spaced parallel relationship with respect to said power input shaft, a plurality of torque transmitting gears rotatably mounted on said sleeve shaft in driving relationship with respect to gear elements of said cluster gear assembly, synchronizer clutch means for selectively clutching said gears to said intermediate shaft, said synchronizer clutch means including a sleeve that is axially shiftable to either of two forward drive clutching positions or to a position intermediate said clutching positions, a synchronizer hub carrying said sleeve, said hub being secured to said intermediate shaft, a reverse idler gear journaled for rotation in said casing in spaced parallel relationship with respect to said cluster gear assembly, said idler gear being engageable with a gear element of said cluster gear assembly, said sleeve carrying a reverse gear element about its periphery, the gear element of said sleeve being engageable with said idler gear when said sleeve assumes said intermediate position whereby said idler gear and the gear element of said sleeve define a portion of a reverse torque delivery path between said power input and power output shafts, the release of said driving connection between said sleeve and output shafts enabling the removal of said sleeve shaft and gear mechanism from said casing.

6. A power transmission mechanism comprising spaced transmission casing portions, a power output pinion, a sleeve shaft connected to said pinion, means for journaling said sleeve shaft at spaced locations within one of said casing portions, a power transmitting gear train situated in the other casing portion, a power input shaft extending concentrically through said sleeve shaft and through said other portion, clutch means located adjacent one end of said other casing portion for releasably connecting said power input shaft to a power input gear element of said gear train, said power input gear element being positioned adjacent the other end of said other casing portion, an intermediate shaft disposed about said power input shaft within said other casing portion, said gear train including torque transmitting gear elements journaled upon said intermediate shaft, said gear elements being engageable with elements of said cluster gear assembly, said power input pinion being disposed in driving relationship with another element of said cluster gear assembly, said clutch means including a hub, said power input gear including a hub encircling said power input shaft, and releasable splined connections between said power input shaft and said clutch hub and between said power input shaft and the hub of said power input gear whereby said power input shaft may be withdrawn from said intermediate shaft in the direction of its axis.

References Cited in the file of this patent

UNITED STATES PATENTS

| | | |
|---|---|---|
| 1,654,924 | Douglas | Jan. 3, 1928 |
| 1,886,003 | Garrison | Nov. 1, 1932 |
| 2,038,326 | Wagner | Apr. 21, 1936 |
| 2,206,409 | Kummich | July 2, 1940 |
| 2,261,898 | Barkeij | Nov. 4, 1941 |
| 2,615,346 | Simpson et al. | Oct. 28, 1952 |
| 2,876,642 | Randol | Jan. 27, 1959 |
| 2,993,574 | Gardner | July 25, 1961 |

FOREIGN PATENTS

| | | |
|---|---|---|
| 1,053,325 | Germany | Mar. 19, 1959 |